United States Patent
Alkaher et al.

(10) Patent No.: US 11,247,819 B2
(45) Date of Patent: Feb. 15, 2022

(54) BIO-DEGRADABLE POLYMERIC SHEET

(71) Applicant: Elbit Systems Ltd., Haifa (IL)

(72) Inventors: Shlomo Alkaher, Haifa (IL); Dan Lewitus, Haifa (IL); Amos Ophir, Haifa (IL); Ana Lea Dotan, Haifa (IL)

(73) Assignee: Elbit Systems Ltd., Haifa (IL)

( * ) Notice: Subject to any disclaimer, the term of this patent is extended or adjusted under 35 U.S.C. 154(b) by 55 days.

(21) Appl. No.: 16/019,571

(22) Filed: Jun. 27, 2018

(65) Prior Publication Data

US 2018/0305099 A1 Oct. 25, 2018

Related U.S. Application Data

(63) Continuation-in-part of application No. PCT/IL2016/051385, filed on Dec. 27, 2016.

(30) Foreign Application Priority Data

Dec. 27, 2015 (IL) .......................................... 243356

(51) Int. Cl.
*B65D 65/46* (2006.01)
*B65D 85/72* (2006.01)
(Continued)

(52) U.S. Cl.
CPC .............. *B65D 65/466* (2013.01); *B32B 7/04* (2013.01); *B32B 9/02* (2013.01); *B32B 9/04* (2013.01);
(Continued)

(58) Field of Classification Search
CPC ............ B32B 2439/40; B32B 2439/46; B32B 2553/00; B32B 27/06; B32B 27/08;
(Continued)

(56) References Cited

U.S. PATENT DOCUMENTS 5,091,262 A 2/1992 Knott et al.
5,108,807 A * 4/1992 Tucker ................... B32B 27/08
428/35.2
(Continued)

FOREIGN PATENT DOCUMENTS

FR 2178461 11/1973
FR 2791603 10/2000
(Continued)

OTHER PUBLICATIONS

Olivier Martin et al. "Properties of Biodegradable Multilayer Films Based on Plasticized Wheat Starch", STARCH: International Journal for the Investigation, Processing and Use of Carbohydrates and their Derivatives, Wiley-VCH Verlag, Weinheim DE, vol. 53, No. 8, Aug. 21, 2001, pp. 372-380.
(Continued)

*Primary Examiner* — Yan Lan
(74) *Attorney, Agent, or Firm* — Pearl Cohen Zedek Latzer Baratz LLP

(57) ABSTRACT

A biodegradable polymeric sheet may be configured to undergo biodegradation on the ground responsive to an exposure to free air and natural day light. The biodegradable polymeric sheet may include a first layer comprising polysaccharide at a weight % of between 15% to 50% and a polyester matrix, the first layer is configured to form a water barrier when in contact with water; a second layer comprising a polysaccharide at a weight % of at least 40% and a polyester matrix; and a third layer comprising polysaccharide at a weight % of between 15% to 50%, a polyester matrix and an additive configured to accelerate disintegration of the polymeric sheet when exposed to natural day light, the third layer is configured to form a water barrier when in contact with water.

9 Claims, 2 Drawing Sheets

(51) Int. Cl.

| | | |
|---|---|---|
| *B32B 23/04* | (2006.01) | |
| *B32B 23/08* | (2006.01) | |
| *B32B 27/18* | (2006.01) | |
| *B32B 27/36* | (2006.01) | |
| *B32B 27/32* | (2006.01) | |
| *B32B 27/06* | (2006.01) | |
| *B32B 7/04* | (2019.01) | |
| *B32B 9/02* | (2006.01) | |
| *B32B 27/08* | (2006.01) | |
| *B32B 9/04* | (2006.01) | |
| *B64D 1/02* | (2006.01) | |
| *B32B 27/20* | (2006.01) | |
| *B32B 23/20* | (2006.01) | |

(52) U.S. Cl.
CPC .............. *B32B 9/045* (2013.01); *B32B 23/04* (2013.01); *B32B 23/08* (2013.01); *B32B 27/06* (2013.01); *B32B 27/08* (2013.01); *B32B 27/18* (2013.01); *B32B 27/20* (2013.01); *B32B 27/32* (2013.01); *B32B 27/36* (2013.01); *B64D 1/02* (2013.01); *B65D 65/46* (2013.01); *B65D 85/72* (2013.01); *B32B 23/20* (2013.01); *B32B 2250/03* (2013.01); *B32B 2250/24* (2013.01); *B32B 2250/244* (2013.01); *B32B 2264/04* (2013.01); *B32B 2264/065* (2013.01); *B32B 2270/00* (2013.01); *B32B 2307/54* (2013.01); *B32B 2307/558* (2013.01); *B32B 2307/7163* (2013.01); *B32B 2307/724* (2013.01); *B32B 2307/728* (2013.01); *B32B 2307/7246* (2013.01); *B32B 2307/7265* (2013.01); *B32B 2307/732* (2013.01); *B32B 2317/18* (2013.01); *B32B 2317/20* (2013.01); *B32B 2439/00* (2013.01); *B32B 2439/40* (2013.01); *B32B 2439/46* (2013.01); *B32B 2553/00* (2013.01); *Y02W 90/10* (2015.05); *Y10T 428/12035* (2015.01)

(58) Field of Classification Search
CPC ......... B32B 27/18; B32B 27/20; B32B 27/32; B32B 27/36; B32B 7/04; B32B 9/02; B32B 9/04; B32B 9/045; B32B 2250/03; B32B 2250/24; B32B 2250/244; B32B 2264/04; B32B 2264/065; B32B 2270/00; B32B 2307/54; B32B 2307/558; B32B 2307/7163; B32B 2307/724; B32B 2307/7246; B32B 2307/7265; B32B 2307/728; B32B 2307/732; B32B 2317/18; B32B 2317/20; B32B 23/04; B32B 23/08; B32B 23/20; B32B 2439/00; B64D 1/02; B64D 1/16; B65D 65/46; B65D 65/466; B65D 85/72; Y02W 90/13; Y10T 428/12035

See application file for complete search history.

(56) References Cited

U.S. PATENT DOCUMENTS

| | | |
|---|---|---|
| 2002/0094444 A1 | 7/2002 | Nakata et al. |
| 2006/0011355 A1 | 1/2006 | Cleary et al. |
| 2007/0042207 A1 | 2/2007 | Berger et al. |
| 2009/0179069 A1 | 7/2009 | Schmidt et al. |
| 2011/0133036 A1 | 6/2011 | Goddard et al. |

FOREIGN PATENT DOCUMENTS

| | | | |
|---|---|---|---|
| WO | WO2008003671 | * | 1/2008 |
| WO | WO 2010144431 | | 12/2010 |

OTHER PUBLICATIONS

Office Action for IL Patent Application No. 963350, dated Jul. 4, 2016.

Singh B. and Sharma N. "Mechanistic implications of plastic degradation". Polymer Degradation and Stability, vol. 93, 2008, pp. 561-584.

Amala A. et al. "An overview of degradable and biodegradable polyolefins", Progress in Polymer Science, vol. 36, Issue 8, Aug. 2011, pp. 1015-1049.

Office Action for IL Patent Application No. 963350, dated Jan. 15, 2018.

Search Report of EP Application No. 18823437.1 dated Mar. 2, 2021.

* cited by examiner

BIO-DEGRADABLE POLYMERIC SHEET

CROSS REFERENCE TO RELATED APPLICATIONS

This Application is a Continuation-In-Part of International Application No. PCT/IL2016/051385, filed Dec. 27, 2016, which claims priority from Israeli Patent Application No. 243356, filed Dec. 27, 2015, all of which are incorporated in their entirety herein by reference.

FIELD OF THE INVENTION

The present invention relates to the field of biodegradable sheets and, more particularly, to biodegradable sheets configured to be biodegraded on the ground in the free air.

BACKGROUND OF THE INVENTION

There is a growing need for packages or plastic sheets made of biodegradable materials. Polymeric packages or plastic sheets, manufactured to be biodegradable are required to be consistent with a disposal method. Some known disposal methods are: disintegration of the polymeric material and composting, bury the used packages or plastic sheets underground or covering them with dirt.

Disintegration involves breaking of at least some of the bonds between the polymer chains due to the exposure of the polymer to UV light (e.g., UV light coming from the sun), thus causing disintegration of the polymeric package into small pieces. Such small pieces if not further decomposed may remain in garbage yards or containers for years. Composting or underground burial involves complete fragmentation of the polymer into carbon dioxide, water, inorganic compounds and biomass leaving no distinguishable or toxic residues.

Composting processes are conducted at closed containers, under controlled environment having controlled temperature and humidity levels, while underground burial requires the use of heavy machinery to cover the plastic residues. The composting process, or the underground degradation process, involves a digestion of the polymer by microorganisms into harmful compounds. Such polymers usually contain large amount of digestible material such as starch acting as the "substrate" for the microorganisms.

Full disintegration and fragmentation of a polymeric package or polymeric sheets into carbon dioxide, water and other harmless compounds in open air, on the ground is very desirable. Furthermore, when being burned either accidentally or on-purpose it may be desirable that that product of the burning of the polymeric package will not contain any harmful gases.

SUMMARY OF THE INVENTION

Some embodiments of the invention may be directed at a biodegradable polymeric sheet. Such biodegradable polymeric sheet may be configured to undergo biodegradation on the ground responsive to an exposure to free air and natural day light. The biodegradable polymeric sheet may include a first layer that may be configured to form a water barrier when in contact with water and a second layer comprising a polysaccharide rich blend. Some embodiments of the invention may be in a form of a container for holding liquids made from the aforementioned bio-degradable polymeric sheet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
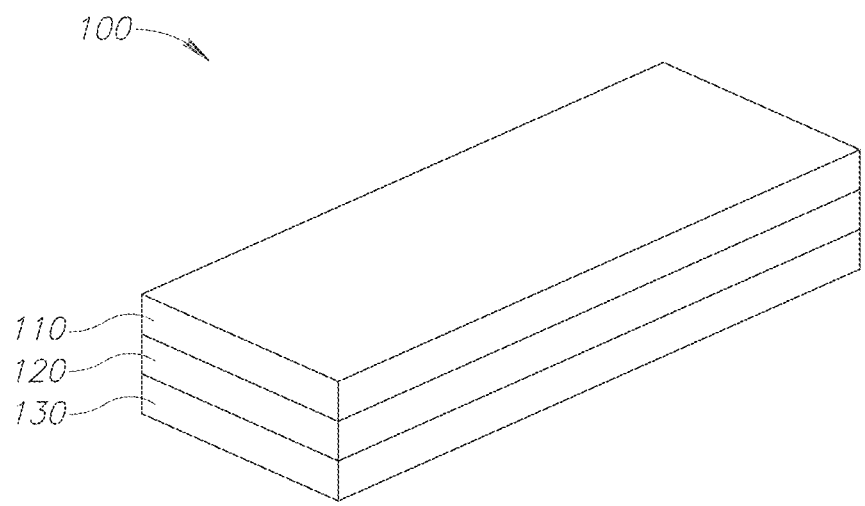
FIG. 1 is an illustration of various layers in an exemplary bio-degradable polymeric sheet according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some aspects of the present invention may be related to biodegradable polymeric sheets. Such sheets may be used to form packages and containers for holding liquids such as water or other aqueous solutions. As used here biodegradation is defined as degradation of the polymer into $CO_2$, water and biomass. In some embodiments, the biodegradation may further contain small amounts of inorganic materials (e.g., iron, calcium-carbonate). Biodegradable polymeric sheets according to embodiments of the invention may include polysaccharide rich blends, for example, starch, cellulose, lignin and chitin. The polysaccharide rich blends are highly hydrophilic thus, including such compounds in polymeric sheets for forming container for aqueous solutions may raise a difficulty.

In some embodiments, the biodegradable polymeric sheets may have to undergo biodegradation on the ground (e.g., on the earth, on the soil) responsive to an exposure to free air and natural daylight. A biodegradable polymeric sheet according to embodiments of the invention or a container made from such polymeric sheet, when left on the ground in the free air may disintegrate into $CO_2$, water and biomass. The biodegradation may be caused by digestion and/or consumption of the polymeric sheets by microorganisms (e.g., bacteria), funguses or other organisms on the ground. The biodegradation process may take a relatively short period of time, for example, 6 month, 12 month, 18 month or 24 month.

In some embodiments, in order to accelerate the biodegradation, the polymeric sheet may further be configured to be disintegrated into small polymeric pieces. UV light coming from the sun (during day hours) may cause degradation of the polymeric chains. This process may be accelerated by adding pro-oxidative additives to the polymer. In order to achieve a complete biodegradation on the ground, the polymeric sheet may include a combination of polyester and starch, both of which are consumed well by microorganisms (e.g., bacteria), funguses or other organisms on the ground. The amount of starch or other polysaccharides in each layer may be at least 15%. As it would have been known in the art a preferred amount of stretch in the entire sheet should be at least 20 weight % or even 30 weight % however, this may be directed to the average of all layers in the sheet. In some embodiments, a combination of two or more layer in which one may have higher amount of at least 40 weight % polysaccharides and the other at least 15 weight % polysaccharides may have the same effect. Furthermore, since the claimed sheet is to be biodegraded on the ground in the free air due to the exposure to natural day light, pro-oxidative additives such as iron (III) stearate may be added in order to decompose the sheet into smaller pieces which may allow the microorganism to consume the sheet even when the amount of polysaccharides in at least one layer is lower than 20 or 30 weight %.

The combined effect of the relatively large amount of polysaccharides (at least 15 weight % in all layers), the use of the biodegradable polyester and the pro-oxidative additives in at least one external layer may allow a complete biodegradation on the aground, at relatively short time (e.g., 6 month). As would have been known to one skilled in the art, usually biodegradation is taking place in closed humid composters. Bio degradation on ground is much more challenging thus may require the use of a unique combination according to embodiments of the invention.

Therefore, biodegradable polymeric sheet according to some embodiments of the invention may include two or more layers. A first layer may be configured to act as an effective water barrier for holding the water or aqueous solution and a second layer configured to encourage the biodegradation of the entire polymeric sheet.

Reference is now made to FIG. 1 that is an illustration of various layers in an exemplary biodegradable polymeric sheet according to some embodiments of the invention. A bio-degradable polymeric sheet 100 may include a first layer 110 and a second layer 120 comprising a polysaccharide rich blend. First layer 110 may be configured to form a water barrier when in contact with water the water barrier may last at least one week. Biodegradable polymeric sheet 100 may undergo biodegradation on the ground responsive to an exposure to free air and natural day light. Biodegradable polymeric sheet 100 may be fabricated using any known method of fabricating multilayer polymeric sheets. Biodegradable polymeric sheet 100 may have a total thickness of at least 30 µm, 40 µm or 50 µm or more. In some embodiments, the total thickness of polymeric sheet 100 may be at most 100 µm, 150 µm, 200 µm, 300 µm, 500 µm, or 1 mm.

In some embodiments, first layer 110 may include a polymer matrix and filler. The polymer may include, for example, polyester, polyethylene, or the like and the filler may include polysaccharide rich blend, for example, starch, cellulose, lignin, chitin or any combination thereof. In some embodiments, the first layer may include between 15-50 (e.g., 20%, 25%, 30%, etc.) weight % of polysaccharide rich blend. In some embodiments, the first layer may include up to 50 weight % of polysaccharide, for example, up to 40 weight %. In some embodiments, first layer 110 may have a thickness of at least 5 µm, for example 10 µm, 20 µm, 30 µm.

In some embodiments, the first layer may further include an additive configured to accelerate disintegration of the polymeric sheet when exposed to natural day light. Such an additive may include pro-oxidative additives (also known as OXO additives). Exemplary OXO additives may include transition metal stearates that are known to induce fragmentation and degradation in polyolefins in low concentrations (e.g., 5000 PPM and less). Transition metals can switch between two oxidation states resulting in catalytic decomposition to hydroperoxides that accelerate the degradation process. In some embodiments, the pro-oxidative additives may include iron (III) stearate.

Figure 2:
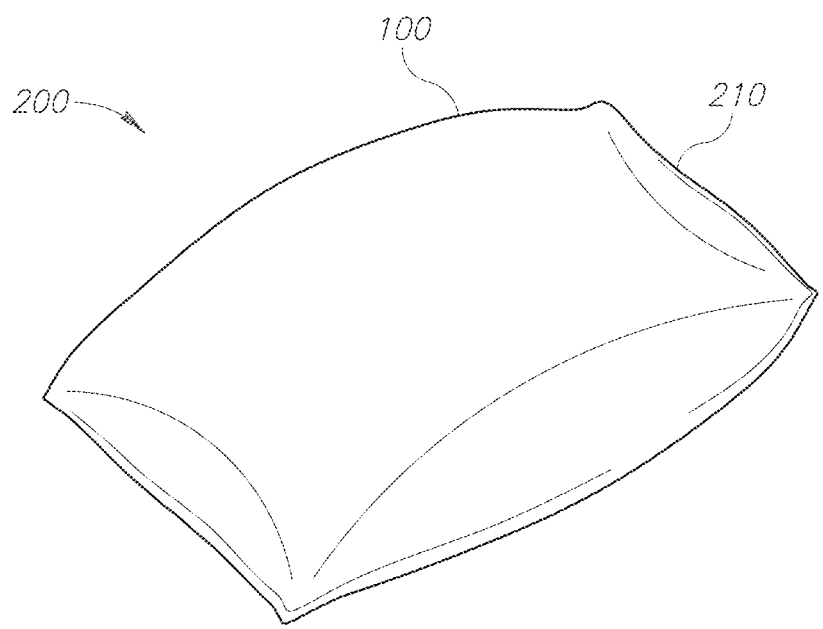
FIG. 2 is an illustration of an exemplary container according to some embodiments of the invention.

In some embodiments, the first layer may be configured to block water molecules migration for at least 3 hours, 6 hours, ½ a day, one day, 2 days, 5 days, one week or more. For example, when a first side of sheet 100 comprising first layer 110 is in contact with water, first layer 110 may be configured to allow the diffusion of no more than 10% of the water from the first side to a second side of sheet 100, during the at least 3 hours, 6 hours, ½ a day, one day, 2 days, 5 days, one week or more. In some embodiments, sheet 100 may be in full contact with the water, such that every external portion of layer 110 may be in contact with the water. In some embodiments, the water may further apply a pressure on polymeric sheet 100 and layer 110 may held the water barrier under the applied pressure, as disclosed below with respect to FIG. 2. In some embodiments, the entire water vapor transmission rate of biodegradable polymeric sheet 100 may not exceed 50-800 [g/m$^2$ day] at 37° C. according to ASTM E-96 standard. An exemplary container (e.g., a milk bag) made from polymeric sheet 100 may hold water or other water based solutions for at least one week, even when a plurality of containers (e.g., bags filled with water based solutions) are held together in a tank, such that the upper containers in the tank may press the lower containers. An exemplary container is illustrated in FIG. 2.

An exemplary first layer 110 may include polyester with 20 weigh % thermoplastic starch and 0.5 weight % $C_{54}H_{105}FeO_6$ (FeSt OXO). Such a composition may form a water barrier with good impact and strength properties. However, due to the relatively low starch content, such a layer may only have a medium biodegradability.

Second layer 120 may include a polymeric matrix and filler. The filler may include polysaccharide rich blend, for example, being at least 40 weight % from the total weight of layer 120. The polysaccharide rich blend may be starch, cellulose, lignin, chitin or a combination thereof. The matrix may include polymers, for example, polyesters, polyethylene, or the like. Second layer 120 may be configured to enhance the biodegradation of sheet 100, by providing more nutritious materials for the bacteria, fungus or other microorganisms to consume. The polysaccharide rich blend in layer 120 may supply the nutritious materials. In some embodiments, first layer 120 may have a thickness of at least 20 µm, for example, 40 µm, 60 µm or more.

In some embodiments, second layer 120 may further include an additive configured to accelerate disintegration of the polymeric sheet when exposed to natural day light. Such an additive may include pro-oxidative additives (also known as OXO additives), as discussed herein.

In some embodiments, adding large amounts of polysaccharide rich blend may reduce the mechanical strength of the layer and may further made the layer highly hydrophilic. Therefore, although having very good biodegradation properties, second layer 120 may not form by itself a container for holding water based solutions.

In some embodiments, biodegradable sheet 100 may further include a third layer 130. Layer 130 may be located at the other side of layer 120 not being attached to layer 110 (as illustrated) such that second layer 120 is covered by layers 110 and 130 from both sides. Layer 130 may be configured to form a water barrier when in contact with water. The water barrier may last at least 3 hours, 6 hours, ½ a day, one day, 2 days, 5 days, one week or more. Layer 130 may include a polymer matrix and filler. The polymer may include, for example, polyester, polyethylene, or the like and the filler may include polysaccharide rich blend, for example, starch, cellulose, lignin, chitin or any combination thereof. In some embodiments, the first layer may include between 15-50 (e.g., 20, 25, 30 etc.) weight % of polysaccharide rich blend. In some embodiments, the third layer may include up to 50 weight % of polysaccharide, for example, up to 40 weight %. In some embodiments, first layer 130 may have a thickness of at least 5 µm, for example, 20 µm.

Third layer 130 may be configured to block water molecules from passing through polymeric sheet 100. For example, when sheet 100 is included in a container for holding water, third layer 130 may allow less than 10% of the water held in the container to evaporate from the container during one week. The three layer structure of sheet 100 may be configured to prevent water and moisture to be in contact with hydrophilic layer 120. In some embodiments, sheet 100 may include more than three layers. In some embodiments, the third layer may include an additive configured to accelerate disintegration of the polymeric sheet when exposed to natural day light. Such an additive may include pro-oxidative additives (also known as OXO additives), as discussed herein.

In some embodiments, biodegradable sheet 100 may have a tensile strength of at least 10 MPa, for example, 15 MPa, 20 MPa, 30 MPa or more. In some embodiments, biodegradable sheet 100 may have an elongation at break of at least 100%, 200%, 300%, 400% or more. In some embodiments, first layer 110 may provide in addition to being a water barrier also the tensile strength required by the various applications in which polymeric sheet 100 is to be used. For example, the strength required to hold water in a container made from sheet 100.

In some embodiments, the thicker layer 110 is the stronger sheet 100 may be. Sheet 100 having first layer 110 thicker than second layer 120 may have higher tensile strength than a sheet having first layer 110 thinner than second layer 120 or having the same thickness. For example, for the same total thickness (e.g., 100 µm) sheet 100 that includes layers thickness ratios of 60% layer 110 (e.g., 60 µm) and 40% (e.g., 40 µm) layer 120 may be stronger than sheet 100 having 50% (e.g., 50 µm) of each layer. When adding an additional third layer, such as layer 130 having similar or close properties to layer 110, the strength may further increase. Accordingly, a three layered sheet having the following thickness ratios: 30% layer 110, 40% layer 120 and 30% layer 130 may have higher tensile strength than a three layered sheet having thickness ratios: 25% layer 110, 50% layer 120 and 25% layer 130 (for the same total thickness). In some embodiments, the total thickness of sheet 100 and the thickness ratio between the first, second and optionally third layer may be determine according to the final required tensile strength. For example, the tensile strength required by a water (or other liquid) container, such as the container of FIG. 2.

Reference is now made to FIG. 2 that is an illustration of a container 200 for holding water based solutions according to some embodiments of the invention. Container 200 may be made from biodegradable sheet 100. Container 200 may include sealing 210. Sealing 210 may be strong enough to hold the water inside container 200 without braking or water evaporation. Container 200 may be sealed such that no more than 10 weight % of the water held in the container may evaporate during, one day, 2 days, 5 days, one week or more.

Container 200 may have a variety of sizes, each designed to hold different amount of liquids. Container 200 may be designed to hold liquids from 1 milliliter (ml)-100 liter (1) or more. For example, 10 ml, 50 ml, 100 ml, 200 ml, 500 ml, 1 liter, 5 l and 10 l.

In some embodiments, the strength of container 200 may be such that when a plurality of containers 200 are pile together, for example, in a tank, both sheet 100 and sealing 210 may hold the water inside each one of the plurality of containers 200. For example, the strength of sheet 100 and sealing 210 may be such that container 200 having a volume of 200 ml. filled with water can endure a compression pressure applied on the filled container by an external load of at least 30 kg, 40 kg, 50 kg or more.

In some embodiments, biodegradable polymeric sheet 100 and container 200 may be configured to undergo a biodegradation on the ground responsive to an exposure to free air and natural day light, during no more than 24 months, for example, during no more than 18 months, during no more than 12 months or during no more than 6 months. Biodegradable polymeric sheet 100 and container 200 may undergo the biodegradation to environmentally harmless materials according to at least one of: ISO 20200, ASTM 6400, ISO 14855 and EN13432. For example, sheet 100 and container 200 left on the ground in the free air may undergo a biodegradation by bacteria and/or fungus located in the soil to produce $CO_2$, water and biomass.

In some embodiments, when placed in a fire (either intentionally or unintentionally) sheet 100 and container 200 may be configured to be burned in the fire without emitting hazardous gasses. As used herein hazardous gasses may include gases that are harmful to humans when inhaled or ingested in various quantities. Additionally, hazardous gasses may further include gases that may continue burning or may explode. For example, incomplete burning may lead to the emission of toxic CO, adding various chemicals to the polymeric matrix in at least one of layers 110, 120 or 130 may result in emitting other harmful gases. Accordingly, sheet 100 and container 200 may include only materials that can be fully burned to form $CO_2$ (in the open air) and not emit any other toxic or hazardous gasses.

EXPERIMENTAL RESULTS

Experiments were conducted using biodegradable polymeric sheets having structure and composition as listed in table 1:

TABLE 1

| Layer | Thickness | Composition |
|---|---|---|
| A | 15 µm | 99.4% biodegradable polyester with 20% starch, 0.5% photo accelerator (Fe(III)St) + 0.1% slip (erucamide) |
| B | 40 µm | Biodegradable polyester with high quantity of starch (over 50%) |
| C | 15 µm | 99.5% biodegradable polyester with 20% starch, 0.5% photoaccelerator (Fe(III)St) |

Tensile Test

Tensile tests were conducted to the biodegradable polymeric sheets having the structure disclosed in table 1. The biodegradable polymeric sheets were tested 7 times in two directions: machine direction (MD—the extrusion direction) and transverse direction (TD). The mean stresses at maximum load and the stain at the breaking point are given in table 2: The tests were conducted at a temperature of 23° C., 50% humidity, full scale load of 0.5 kN and crosshead speed of 500 mm/min

TABLE 2

|  | MD | | TD | |
| --- | --- | --- | --- | --- |
|  | Stress at Max load (MPa) | Strain at Break (%) | Stress at Max load (MPa) | Strain at Break (%) |
| Mean | 15.2 | 652 | 12.5 | 591 |
| Standard deviation | 0.4 | 13 | 0.2 | 41 |

As can clearly be seen the mean stress at the maximum load in both direction is higher than 10 MPa and the strain or elongation at the breaking point is much higher than 100%.

On the Ground Biodegradation Test

Figure 3A:
FIGS. 3A and 3B are photographs of 3 types of sheets according to some embodiments of the invention.
Figure 3B:

The biodegradable polymeric sheets having the structure disclosed in table 1 were tested for biodegradation on the ground responsive to an exposure to free air and natural day light. FIGS. 3A and 3B are photographs of 3 types of sheets 310-330 taken at day 1 (FIG. 3A) and day 63 (FIG. 3B) after being left on the ground during the summertime in California. Sheets 310 were made from paper, sheets 320 were made from the same biodegradable polymeric sheets disclosed above and sheets 330 were the same sheets as sheets 320 after being soaked in river water for 1 hour. As can clearly be seen all the biodegradable polymeric sheets were disintegrated and at least partially degraded after 63 days while the paper sheets stayed the same. As expected when adding even small amounts of water the biodegradability of the sheets increases.

Water Transmission Tests

The water vapor transmission of two samples of the biodegradable polymeric sheets having the structure disclosed in table 1 was tested. The water vapor transmissions of both samples were 376 g/(m²·day) and 327 g/(m²·day). Both samples has water vapor transmissions of less than 380 g/(m²·day).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A biodegradable polymeric sheet, the polymeric sheet having a machine extrusion direction and a transverse direction, and comprising:
    a first layer comprising polysaccharide at a weight % of between 15% up to 40%, a polyester matrix and an OXO additive, the first layer is configured to form a water barrier when in contact with water, so that the water vapor transmission rate of the biodegradable polymeric sheet is between 50-800 g/m² day at 37° C. according to ASTM E-96;
    a second layer comprising a polysaccharide at a weight % of at least 40% and a polyester matrix; and
    a third layer comprising polysaccharide at a weight % of between 15% up to 40%, a polyester matrix and an OXO additive configured to accelerate disintegration of the polymeric sheet when exposed to natural day light, the third layer is-configured to form a water barrier when in contact with water,
    wherein the first sheet is extruded, and
    wherein the biodegradable polymeric sheet undergoes biodegradation on the ground responsive to an exposure to free air and natural day light.

2. A biodegradable polymeric sheet according to claim 1, wherein the biodegradation occurs during no more than 18 months.

3. A biodegradable polymeric sheet according to claim 1, wherein the biodegradation occurs during no more than 6 months.

4. A biodegradable polymeric sheet according to claim 1, wherein the polysaccharide comprises at least one of: starch, cellulose, lignin and chitin.

5. A bio-degradable polymeric sheet according to claim 1, having a tensile strength of at least 10 MPa.

6. A bio-degradable polymeric sheet according to claim 1, having an elongation at break of at least 100%.

7. The bio-degradable polymeric sheet according to claim 1, further configured to undergo the complete bio-degradation to environmentally harmless materials according to at least one of: ISO 20200, ASTM 6400, ISO 14855 and EN13432.

8. The bio-degradable polymeric sheet according to claim 1, further configured to be burned in a fire without emitting hazardous gasses.

9. A container for holding liquids made from a bio-degradable polymeric sheet according to claim 1.

* * * * *